Figure 1:
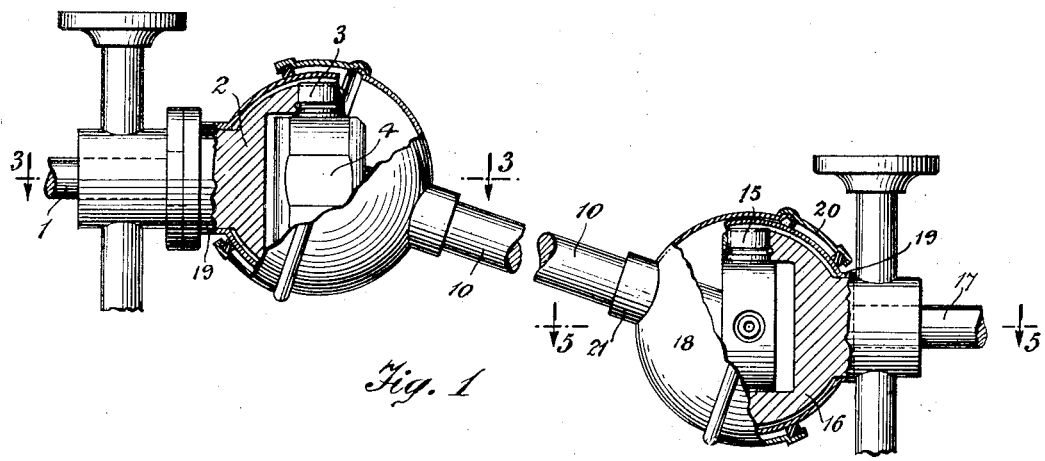

F. L. BERARDINELLI AND T. S. WIKOFF.
FLEXIBLE SHAFT.
APPLICATION FILED AUG. 21, 1915.

1,330,051.

Patented Feb. 10, 1920.
2 SHEETS—SHEET 1.

WITNESSES:
A. Spitznagel

INVENTORS
Fred L. Berardinelli
Thomas S. Wikoff
BY
R. Julian Sachers
their ATTORNEY

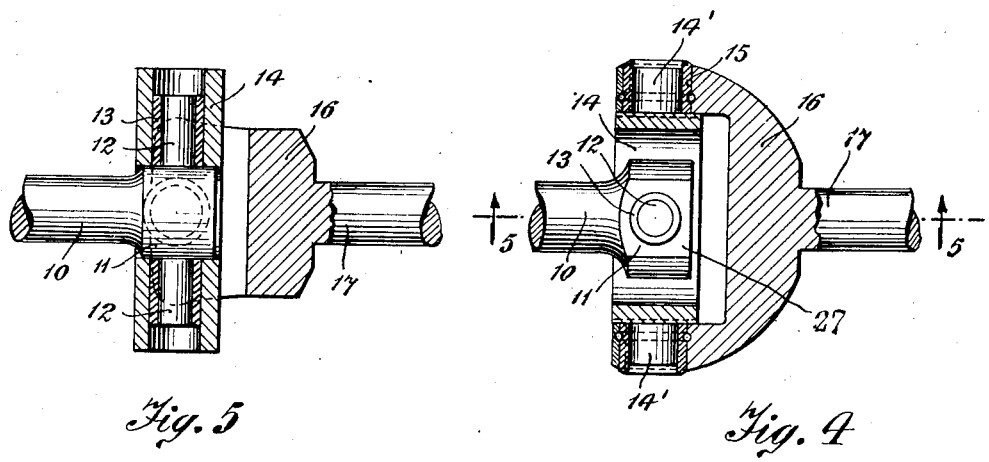
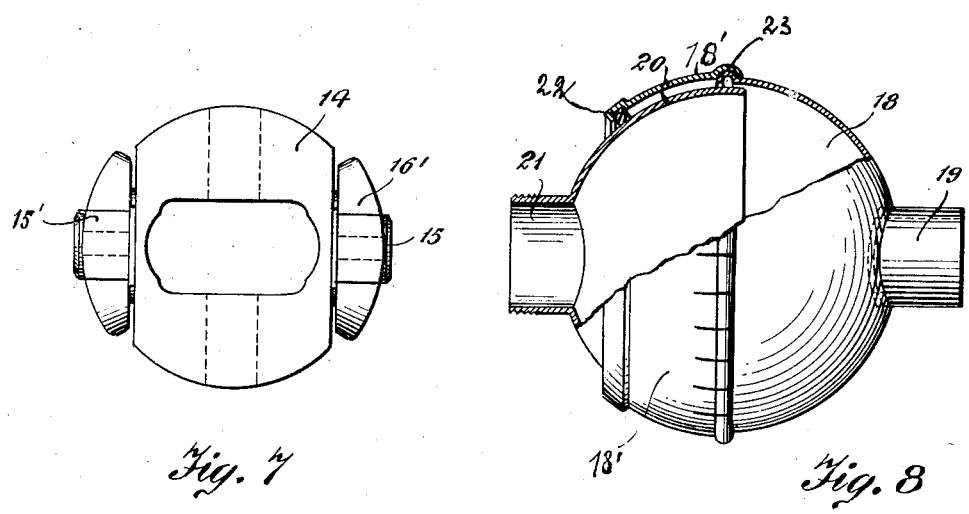

UNITED STATES PATENT OFFICE.

FRED L. BERARDINELLI AND THOMAS S. WIKOFF, OF PLAINFIELD, NEW JERSEY.

FLEXIBLE SHAFT.

1,330,051.  Specification of Letters Patent.  Patented Feb. 10, 1920.

Application filed August 21, 1915. Serial No. 46,633.

*To all whom it may concern:*

Be it known that I, FRED L. BERARDINELLI, a citizen of the Kingdom of Italy, and THOMAS S. WIKOFF, a citizen of the United States, both residents of Plainfield, in the county of Union and State of New Jersey, have jointly Invented an Improved Flexible Shaft, set forth in the following specification.

The flexible shaft forming the subject matter of the present invention is characterized by extreme simplicity of construction, great efficiency of function and operation and cheapness of manufacture. It is primarily intended for automobile use, but can obviously be applied for connecting any driving shaft to a driven shaft, where the shafts are arranged, otherwise than co-axially.

The drawing shows the invention in—

Figures 2, 3:
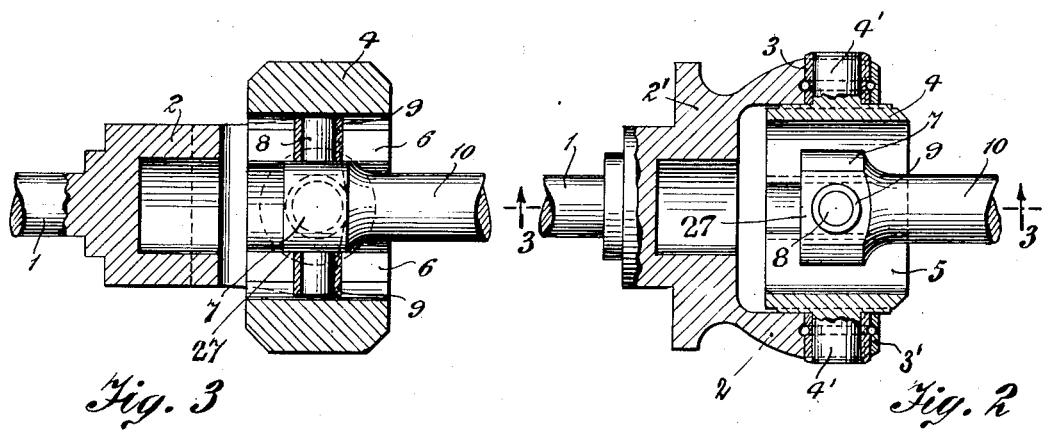
Figure 6:
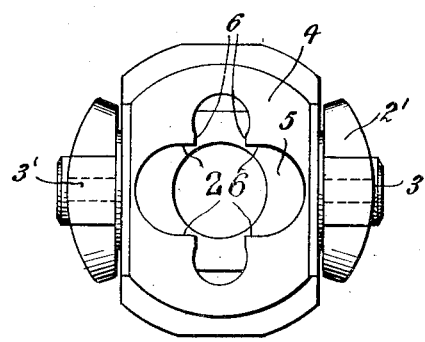

Figure 1 as a side elevation of the assembled device, part of the inclosing shell and the transmitting members in cross section, Fig. 2 is a vertical axial cross section of the driving joint, Fig. 3, a horizontal axial cross section on lines 3—3 of Figs. 1 and 2, Fig. 4, a vertical axial cross section of the driven joint, Fig. 5, a horizontal axial cross section in lines 5—5 of Figs. 1 and 4, Fig. 6, an end view of the driving joint, having the connecting shaft removed, Fig. 7, a similar view of the driven joint, and Fig. 8, a side elevation, partly broken away, of the inclosing shell.

The driving shaft of a motor, such as a hydrocarbon engine of the explosive type, is indicated at 1, and is integral with, or has secured thereto a driving head 2. The driving head is provided with, preferably, diametrically opposite arms 2', Fig. 6, holding the bearing bushings 3 between jaws. The split of the jaws is closed by means of a cover or connector 3', welded onto the end of the jaws and made integral therewith.

A trunnion block 4 is located between the two arms of the driving head, and has pivots or journals 4' turning in bearing bushings 3. The split in the jaws is preferably wide enough to admit the journals 4', but not wide enough to admit the bushings 3. In assembling, the journals are first inserted laterally thereof, and the bushings are then inserted axially over the journals. This locks the journals in the bearings. The connectors are then welded on.

The trunnion block is provided with a recess 5 having longitudinal slots or working faces 6, which slots are slightly deeper than the length of the pins 8 of the crosshead 7. The pins 8 are preferably provided with anti-friction rollers 9 which are of a diameter to fit snugly in the slots 6. By this means the crosshead is enabled to move lengthwise of the shaft, so as to compensate for any shortening or lengthening of the shaft. The use of the rollers 9 decreases the friction and enables the crosshead to move forward and back with little or no frictional loss. In order to relieve the pins 8 as much as possible from the torsional strains, I provide in the trunnion block 4 opposing bearing faces 26, 26. The crosshead 7 has oppositely-arranged flat bearing surfaces 27 which fit against the bearing faces 26 with a smooth sliding fit and thus assist in transmitting the torsional strain. The crosshead 7 may be integral with or connected to the shaft 10 connecting the driving joint with the driven joint.

The latter comprises the crosshead 11, connected to or integral with the shaft 10, and carrying the pins 12, resting in the bearing 13, forming part of or secured to the trunnion block 14. The latter is provided with the journals 14', resting in the bearing bushings 15 of the driven head 16.

The jaws 16' of the driven head are similarly constructed to those of a driving head and the bearing bushings 15 are firmly secured in the jaws by the piece 15' welded across the split of the jaws.

The driven head is connected to, or integral with, the driven shaft 17. If desired, connection between either of the heads, the driving or driven head and the driving or driven shaft, may be made by means of a flange 2'; Fig. 2, secured to a similar flange on the motor shaft, and the like.

For the purpose of preventing the entrance of dust, to the joint and serving as a holder for lubricating material, a casing is provided for each joint, preferably spherical or oval in shape and comprising a member 18, having a neck 19, secured to the driving or driven head, or its flange, and a member 20, having a neck 21, surrounding the ends of the connecting shaft 10. If filled with lubricant, the escape of the same from the casing is prevented by the packing material 22. The shell member 18 is made substantially hemispherical in shape, and a segment 18', secured thereto by means of the bead 23. The portions 18 and 18' are adapted to be connected by one part slipping over the other part. In order to permit this, one of the portions (preferably 18') is provided with meridional slits which permit the beaded portion to expand so as to slip over the opposite beaded portions.

Claims:

1. A universal joint comprising a yoke, a trunnion pivoted to said yoke to oscillate in one plane, a shaft or the like pivoted to said trunnion to oscillate in a different plane, and a slideway formed in one of said parts, adapted to receive the pivots of another of said parts, whereby to permit longitudinal extension or contraction of said joint.

2. A universal joint comprising a yoke, a trunnion pivoted to said yoke to oscillate in one plane, a shaft or the like pivoted to said trunnion to oscillate in a different plane, a slideway formed in one of said parts, adapted to receive the pivots of another of said parts, whereby to permit longitudinal extension or contraction of said joint, and bearing faces on the part having the slideway adapted to engage the sliding part.

3. A universal joint comprising a yoke, a trunnion pivoted to said yoke to oscillate in one plane, a shaft or the like pivoted to said trunnion to oscillate in a different plane, and a slideway formed in said trunnion adapted to permit the pivots of said shaft to slide longitudinally of the joint.

4. A universal joint comprising a yoke, a trunnion pivoted to said yoke to oscillate in one plane, a shaft or the like pivoted to said trunnion to oscillate in a different plane, a slideway formed in said trunnion adapted to permit the pivots of said shaft to slide longitudinally of the joint, and rollers on said pivots.

5. A universal joint comprising a yoke, a trunnion pivoted to said yoke to oscillate in one plane, a shaft or the like pivoted to said trunnion to oscillate in a different plane, a slideway formed in said trunnion adapted to permit the pivots of said shaft to slide longitudinally of the joint, and said trunnion being formed with bearing faces adapted to engage the sides of said shaft.

6. A universal joint comprising a yoke, a trunnion pivoted to said yoke to oscillate in one plane, a shaft or the like pivoted to said trunnion to oscillate in another plane, said trunnion being provided with a slideway, said shaft having side faces, and pivot pins carried by said shaft and connected to said side faces, the said pivot pins sliding in said slideway, and bearing faces on said trunnion adapted to engage the side faces of said shaft.

7. A universal joint comprising a yoke, a trunnion pivoted to said yoke to oscillate in one plane, a shaft or the like pivoted to said trunnion to oscillate in another plane, said trunnion being provided with a slideway, said shaft having side faces, pivot pins carried by said shaft and connected to said side faces, the said pivot pins sliding in said slideway, bearing faces on said trunnion adapted to engage the side faces of said shaft, and rollers on said pivot pins.

8. The combination with a shaft, of a head thereon having jaws for carrying bearings, each jaw being initially split and having a recess adapted to receive the bearing, a bearing in said recess, a connecting member closing said split and made integral with said jaw, a trunnion block having pins engaging said bearings and having a recess forming slideways, a cross-head having anti-friction rollers engaging said slideways, and a transmission shaft connected to said cross-head.

9. The combination with a universal joint, of a casing therefor comprising two hollow shells forming together a substantially spherical casing, a supplemental shell adapted to be fixed to one of said shells, whereby the shells can be separated by removal of said supplemental shell, and a slip connection joining said supplemental shell with the shell which supports it.

10. The combination with a universal joint, of a casing therefor comprising two hollow shells forming together a substantially spherical casing, a supplemental shell adapted to be fixed to one of said shells, whereby the shells can be separated by removal of said supplemental shell, a slip connection joining said supplemental shell with the shells which supports it, and a packing carried by the supplemental shell.

Signed at New York, in the county and State of New York, this 10th day of August, 1915.

FRED L. BERARDINELLI.
THOMAS S. WIKOFF.

In presence of—
R. JULIAN SACHERS.